United States Patent
Buriano et al.

(10) Patent No.: US 8,537,683 B2
(45) Date of Patent: Sep. 17, 2013

(54) METHOD FOR ESTIMATING THE QUALITY OF EXPERIENCE OF A USER IN RESPECT OF AUDIO AND/OR VIDEO CONTENTS DISTRIBUTED THROUGH TELECOMMUNICATIONS NETWORKS

(75) Inventors: Luca Buriano, Turin (IT); Virginio Mario Costamagna, Turin (IT); Pia Maria Maccario, Turin (IT); Claudio Teisa, Turin (IT)

(73) Assignee: Telecom Italia S.p.A., Milan (IT)

( * ) Notice: Subject to any disclaimer, the term of this patent is extended or adjusted under 35 U.S.C. 154(b) by 220 days.

(21) Appl. No.: 13/128,760

(22) PCT Filed: Nov. 13, 2008

(86) PCT No.: PCT/EP2008/065465
§ 371 (c)(1),
(2), (4) Date: May 11, 2011

(87) PCT Pub. No.: WO2010/054690
PCT Pub. Date: May 20, 2010

(65) Prior Publication Data
US 2011/0222669 A1   Sep. 15, 2011

(51) Int. Cl.
*H04M 3/00* (2006.01)
*H04M 5/00* (2006.01)
*H04M 7/00* (2006.01)

(52) U.S. Cl.
USPC ........... 370/235; 370/231; 370/252; 709/224; 709/231; 725/93; 725/116

(58) Field of Classification Search
USPC .............. 370/224, 229, 230, 235, 238, 241, 370/242, 250, 254, 255, 351, 401, 392, 395.21, 370/231, 252; 709/203, 217, 224, 231; 379/1.01, 1.04, 9, 15.03, 24; 725/14, 44, 725/51, 91, 93, 103, 105, 135, 116
See application file for complete search history.

(56) References Cited

U.S. PATENT DOCUMENTS

| | | | |
|---|---|---|---|
| 7,058,048 B2 | 6/2006 | Clark | |
| 7,197,557 B1 | 3/2007 | Asar et al. | |
| 7,620,716 B2 * | 11/2009 | Pirzada et al. | 709/224 |
| 7,633,942 B2 * | 12/2009 | Bearden et al. | 370/392 |
| 8,027,264 B2 * | 9/2011 | Erman et al. | 370/250 |

(Continued)

OTHER PUBLICATIONS

International Search Report from the European Patent Office for International Application No. PCT/EP2008/065465, mailed Sep. 18, 2009.

*Primary Examiner* — Binh Tieu
(74) *Attorney, Agent, or Firm* — Finnegan, Henderson, Farabow, Garrett & Dunner, L.L.P.

(57) ABSTRACT

A method for estimating a quality of experience of a user receiving an information content stream distributed through a telecommunications network, includes: collecting a plurality of measures of at least one characteristic parameter of the information content stream during the distribution thereof through a telecommunications network; deriving from the collected measures an abstract representation in terms of gaps in the information content stream, wherein a gap corresponds to a value of a collected measure below a predetermined threshold; determining a temporal distribution of the gaps in the information content stream; and calculating an index of perceived quality of experience based on the temporal distribution of the gaps in the information content stream, wherein the index of perceived quality is related in a non-linear way to the temporal distribution of the gaps.

15 Claims, 4 Drawing Sheets

(56) References Cited

U.S. PATENT DOCUMENTS

| | | | |
|---|---|---|---|
| 8,199,654 B2* | 6/2012 | Francisco et al. ............. 370/238 |
| 2003/0145319 A1* | 7/2003 | Sato ................................ 725/14 |
| 2004/0210655 A1* | 10/2004 | Martinot et al. ............. 709/224 |
| 2004/0218546 A1 | 11/2004 | Clark |
| 2005/0018798 A1 | 1/2005 | Li |
| 2005/0044560 A1* | 2/2005 | Kryeziu ........................ 725/14 |
| 2006/0190594 A1 | 8/2006 | Jorgenson et al. |
| 2006/0285489 A1* | 12/2006 | Francisco et al. ............ 370/229 |
| 2007/0053303 A1 | 3/2007 | Kryuchkov |
| 2007/0180106 A1* | 8/2007 | Pirzada et al. ................ 709/224 |
| 2008/0298448 A1* | 12/2008 | Erman et al. .................. 375/226 |
| 2009/0213845 A1 | 8/2009 | Li |

* cited by examiner

METHOD FOR ESTIMATING THE QUALITY OF EXPERIENCE OF A USER IN RESPECT OF AUDIO AND/OR VIDEO CONTENTS DISTRIBUTED THROUGH TELECOMMUNICATIONS NETWORKS

CROSS REFERENCE TO RELATED APPLICATION

This application is a national phase application based on PCT/EP2008/065465, filed Nov. 13, 2008, the content of which is incorporated herein by reference.

BACKGROUND OF THE INVENTION

1. Field of the Invention

The present invention generally relates to the field of telecommunications, and more specifically to the distribution of audio (voice, music, audio clips and the like) and/or video (e.g. video clips, movies) contents, e.g. multimedia contents, through telecommunications networks.

2. Description of the Related Art

Thanks to the technology evolution, the bandwidth available in telecommunications networks, using both fixed and mobile devices, has become broad enough to support the development of new services on a massive scale. Among this kind of services, the distribution of streams of audio and/or video contents, e.g. multimedia contents, is one of the most important. Streaming distribution of audio and/or video or multimedia contents is used for example for performing VoIP (Voice over Internet Protocol) phone calls, videocalls, for listening music through, e.g., Internet radio channels, IPTV (IP television), Video on Demand (VOD), content sharing.

In this context, an efficient usage of the available network resources and the ability to measure the quality of the services offered to the customers are important aspects and can determine the success for any player on the market; this is in particular true for telecommunications operators like Telcos, because they can leverage their own networks for providing these services.

The distribution of multimedia content streams in IP (Internet Protocol) network contexts requires to tackle many issues, coming from the specific context itself and from the users' perception and expectation; this information can be derived from the exploitation of similar services historically available in other domains.

The problem of measuring the quality of audio and/or video streaming distribution starting from the analysis of the network used for the provisioning and fruition of such contents has already been addressed in the art.

However, traditional methods of measurement, based on measuring network parameters without estimating the correlation among them, fail to estimate the quality of service from an end user point of view.

In order to estimate the true user's perception, it would be necessary to measure the quality of received content (audio, video, IPTV, VoIP, VOD, shared content) in the same or similar condition the user is when he/she is actually engaged in the content's fruition. This may not be possible by only measuring network parameters.

For example, measuring the available bandwidth is not a sufficient index of the quality perceived by the user during the content's fruition. A same degree of network performance degradation can have a completely different impact on the quality of the service as perceived by different users and in respect of different services, i.e. different distributed contents: for example, in the case of the vision of a movie, a high packet loss rate can be perceived by the users in a different way, depending on the movie's required bandwidth (if the required bandwidth is high, a high packet loss rate has heavier consequences on the users' perception than if the required bandwidth were lower).

Subjective methods known as "Mean Opinion Score" (MOS) (ITU Recommendation G.107—The E-model, a computational model for use in transmission planning P.910 "Subjective video quality assessment methods from multimedia applications") provides for evaluating the perceived quality on a 0-5 range. However, this kind of methods is not useful for large-scale quality analysis campaigns, because they require the availability of trained people, giving uniform judgement through time (e.g. giving the same judgement about the same movie). Another problem in the application of this kind of methods is the impossibility of obtaining a diagnosis on errors' causes.

Better methods for large-scale quality analysis are those based on objective metrics, which have a well defined methodology whose results do not depend on the specific person making the analysis and whose values do not vary during time. A reliable method of estimation of the quality index should take into account the fact that some defects in the received stream are scarcely perceived, or not perceived at all by the users.

U.S. Pat. No. 7,197,557 discloses a system for measuring performance of streaming media sent from a server over a network. The system includes a data acquisition agent connected to the network and operable to send a request for streaming media to the server. The agent is configured to receive streaming media, collect performance measurements, and send the performance measurements to a storage device.

US 2007/053303 discloses a network performance monitor and an associated method for monitoring the perceived transmission quality of a packetized multimedia signal encoded by a first codec. The monitor includes a packet processor for performing real time direct counting of received and lost packets in the burst and gap states in the packet stream carrying the multimedia signal. A data processor is provided for determining packet loss distribution parameters using the burst and gap packet counters provided by the packet processor. The data processor is operative to compute an effective equipment impairment factor from the packet loss distribution parameters for a reference codec having known transmission impairments associated therewith, for assessing the network contribution to the perceived transmission quality of the multimedia signal.

U.S. Pat. No. 7,058,048 discloses a subjective quality monitoring system for packet based multimedia signal transmission systems which determines, during more than one interval of a single call, the level of one or more impairments and determines the effect of said one or more impairments on the estimated subjective quality of said multimedia signal. The quality monitoring system comprises a plurality of quality monitoring functions located at the multimedia to packet conversion points.

US 2006/190594 discloses a method and apparatus for determining the service quality performance of a real-time application, for example VoIP, video over IP or IPTV, operating over a path defined in a packet-based network. Active probing of a path of the packet-based network is performed by transmitting one or more sequences of packets along the path.

SUMMARY OF THE INVENTION

The Applicant has observed that known solutions are not completely satisfactory, and not capable of providing an indication of the actual user's "quality of experience".

In view of the state of the art outlined in the foregoing, the Applicant has tackled the problem of how a reliable, essentially objective estimation of the user's quality of experience can be obtained.

The Applicant has found that the human perception of the quality of an audio and/or video content stream, e.g. a multimedia content stream, is related in a non-linear way to "defects" in the received stream (examples of defects are image freezing, flickering, audio gaps). In other words, the main influence on the perceived quality of an audio, video or multimedia content stream does not, or not only, come from the mere quantity of defects, but is strongly related in a non-linear way to their temporal patterns.

Essentially, the present invention tries to derive an indication of the quality of experience of users based on a modelling of the temporal patterns of defects present in a received audio and/or video content stream, e.g. a multimedia content stream.

One aspect of the present invention relates to a method for estimating a quality of experience of a user receiving an information content stream distributed through a telecommunications network, including:
  collecting a plurality of measures of at least one characteristic parameter of the information content stream during the distribution thereof through a telecommunications network;
  deriving from the collected measures an abstract representation in terms of gaps in the information content stream, wherein a gap corresponds to a value of a collected measure below a predetermined threshold;
  determining a temporal distribution of the gaps in the information content stream; and
  calculating an index of perceived quality of experience based on said temporal distribution of the gaps in the information content stream, wherein said index of perceived quality is related in a non-linear way to said temporal distribution of the gaps.

Said determining a temporal distribution of the gaps in the information content stream may include assessing a temporal distance between the gaps in the information content stream.

Said calculating an index of perceived quality of experience based on said temporal distribution of the gaps may include aggregating a contribution of each pair of consecutive gaps to a level of degradation of the perceived quality of experience.

In particular, said aggregating may include applying to said temporal distribution of the gaps a function:

$$\underset{n=2}{\overset{M}{A}}(f(d(t_{b_n}, t_{b_{n-1}})))$$

wherein:
  $t_{bn}$, $t_{b(n-1)}$ are the temporal positions of two consecutive gaps $b_{(n-1)}$, $b_n$;
  $d(t_{bn}, t_{b(n-1)})$ is a function expressing the temporal distance between the time instants $t_{bn}$, $t_{b(n-1)}$,
  A is an aggregation function for aggregating the contribution of each pair of consecutive gaps to the level of degradation of the perceived quality;
  $f$ is a function of the temporal distance between the time instants $t_{bn}$, $t_{b(n-1)}$.

The function $f$ is preferably such that it increases, in a non-linear way, as the time distance between the time instants $t_{bn}$, $t_{b(n-1)}$ decreases, and, when an overall number M of gaps in the collected measures is equal to a predetermined number and a distribution in time of the gaps corresponds to a worst-case distribution, a level of degradation of the perceived quality is equal to 1.

In an embodiment of the present invention, said aggregating may include applying to said temporal distribution of the gaps a function:

$$S\sum_{n=2}^{M}\frac{1}{\exp(\alpha(t_{b_n} - t_{b_{n-1}}))}$$

wherein:
  exp is the exponential function;
  $\alpha$ is a parameter modulating a contribution of a generic pair of consecutive gaps in dependence of their mutual temporal distance;
  S is a scale factor.

The information content stream distributed through a telecommunications network may include at least one among an audio and a video stream.

Said at least one characteristic parameter may include at least one among a video frame rate, an audio sampling rate, a network bandwidth, a bitrate on receipt.

Another aspect of the present invention relates to a system for estimating a quality of experience of a user receiving an information content stream distributed through a telecommunications network, including:
  at least one unit for collecting a plurality of measures of at least one characteristic parameter of the information content stream during the distribution thereof through a telecommunications network;
  a unit for deriving from the collected measures an abstract representation in terms of gaps in the information content stream, wherein a gap corresponds to a value of a collected measure below a predetermined threshold;
  a unit for determining a temporal distribution of the gaps in the information content stream; and
  a unit for calculating an index of perceived quality of experience based on said temporal distribution of the gaps in the information content stream, wherein said index of perceived quality is related in a non-linear way to said temporal distribution of the gaps.

Said unit for determining a temporal distribution of the gaps in the information content stream may be adapted to assessing a temporal distance between the gaps in the information content stream.

Said unit for calculating an index of perceived quality of experience based on said temporal distribution of the gaps may be adapted to aggregate a contribution of each pair of consecutive gaps to a level of degradation of the perceived quality of experience.

Said unit for calculating an index of perceived quality of experience may be adapted to aggregate said contribution of each pair of consecutive gaps by applying to said temporal distribution of the gaps a function:

$$\underset{n=2}{\overset{M}{A}}(f(d(t_{b_n}, t_{b_{n-1}})))$$

wherein:
  $t_{bn}$, $t_{b(n-1)}$ are the temporal positions of two consecutive gaps $b_{(n-1)}$, $b_n$;

$d(t_{b_n}, t_{b(n-1)})$ is a function expressing the temporal distance between the time instants $t_{b_n}, t_{b(n-1)}$, A is an aggregation function for aggregating the contribution of each pair of consecutive gaps to the level of degradation of the perceived quality;

$f$ is a function of the temporal distance between the time instants $t_{b_n}, t_{b(n-1)}$.

Preferably, the function $f$ is such that it increases, in a non-linear way, as the time distance between the time instants $t_{b_n}, t_{b(n-1)}$ decreases, and, when an overall number M of gaps in the collected measures is equal to a predetermined number and a distribution in time of the gaps corresponds to a worst-case distribution, a level of degradation of the perceived quality is equal to 1.

In an embodiment of the present invention, said unit for calculating an index of perceived quality of experience is adapted to aggregate said contribution of each pair of consecutive gaps by applying to said temporal distribution of the gaps a function:

$$S \sum_{n=2}^{M} \frac{1}{\exp(\alpha(t_{b_n} - t_{b_{n-1}}))}$$

wherein:
exp is the exponential function;
α is a parameter modulating a contribution of a generic pair of consecutive gaps in dependence of their mutual temporal distance;
S is a scale factor.

The information content stream distributed through a telecommunications network may include at least one among an audio and a video stream; said at least one characteristic parameter may include at least one among a video frame rate, an audio sampling rate, a network bandwidth, a bitrate on receipt.

BRIEF DESCRIPTION OF THE DRAWINGS

These and other features and advantages of the present invention will better appear from the following detailed description of some embodiments thereof, provided merely by way of non-limitative examples. The description should be read in conjunction with the attached drawings, wherein.

DETAILED DESCRIPTION OF EMBODIMENTS OF THE INVENTION

Figure 1:
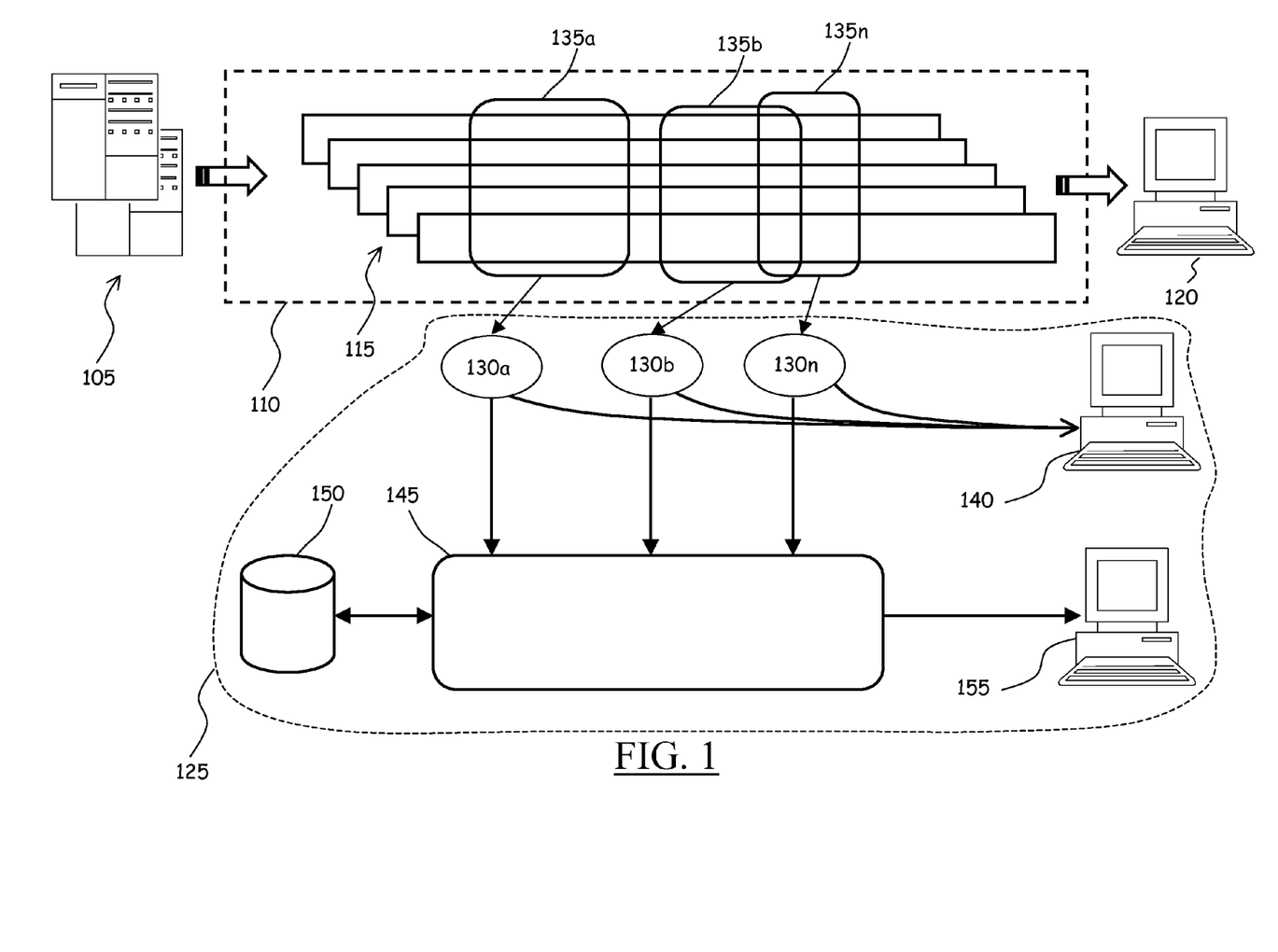
FIG. 1 schematically shows a structure of a system according to an embodiment of the present invention, for obtaining estimations of the quality of experience perceived by users enjoying multimedia contents distributed through a telecommunications network.

Making reference to the drawings, in FIG. 1 an exemplary scenario is schematically shown wherein the present invention is exploitable. The scenario considered is one in which audio and/or video contents, e.g. multimedia contents like for example music, clips, movies, VoIP phone calls, video calls, IPTV, VOD, shared contents and the like are distributed through a telecommunications network 110, e.g. the Internet; hereinafter, without prejudice to the generality of the invention, the distributed contents will be referred to as "multimedia contents". The multimedia contents are made available and distributed by one or more content providers 105 in the form of data streams (e.g., streams of data packets); the generic multimedia content stream, denoted in the figure as 115, may include one or more content components (e.g., one or more audio components, and/or one or more video components), distributed by a same or by different content providers. The multimedia content stream 115 is transported by the telecommunications network 110 to a user equipment 120, connected to the network 110; exploiting the user equipment 120, the user can enjoy the multimedia content. The user equipment 120 may be a personal computer (as in the example depicted), a notebook, a laptop, a palmtop, a cellular phone, a smart phone, a DVBH (Digital Video Broadcasting—Handheld) phone, a PDA (Personal Digital Assistant), a VoIP phone, a set-top box for IPTV, associated to a TV set, a portable media player, and in general any device having data processing capabilities and capable of communicating over the telecommunications network 110.

FIG. 1 also shows schematically the structure of a system according to an embodiment of the present invention, for monitoring the multimedia content stream 115 and estimating a quality of experience as perceived by the user enjoying the multimedia content using the equipment 120.

The system, globally denoted 125, includes one or more monitoring units 130a, 130b, . . . , 130n executing specifically designed software agents adapted to perform measures on specific parameters of one or more of the components of the multimedia content stream 115. The monitoring units 130a, 130b, . . . , 130n wherein the software agents run are preferably distributed in various positions of the telecommunications network 110, in such a way to emulate user equipments connected to the network 110. The number of monitoring units 130a, 130b, . . . , 130n, and the specific functions of each software agent running in the monitoring units 130a, 130b, . . . , 130n depend for example on the nature of the multimedia content stream 115, and on the parameters thereof that it is desired to measure.

For example, the software agents running on the monitoring units 130a, 130b, . . . , 130n are adapted to measure parameters of the multimedia content stream 115 at various levels of the ISO-OSI protocol stack (the specific implementation of each level of the protocol stack may be different for the different components of the multimedia content stream 115, and for different multimedia content streams).

Preferably, the monitoring units 130a, 130b, . . . , 130n, and the software agents running thereon, are structured (from a hardware and software viewpoint) so as to emulate the equipments of the users enjoying the multimedia content distribution service (like the user equipment 120), and of which the quality of experience is to be estimated. For example, in order to emulate the experience of a user who, being for example equipped with a personal computer or a notebook, enjoys music (e.g., broadcast by an Internet radio station) or video-clips or movies using an application like Windows Media Player (WMP) by Microsoft Corp., a software agent may be designed to be adapted to measure the video frame rate, the audio sampling rate, the bandwidth, the bitrate in reception; some of these measures are already provided by WMP software (this is for example the case of the WMP video frame rate, the WMP current bandwidth, the WMP bitrate in reception): thus, by having the monitoring units 130a, 130b, ..., 130n run WMP, the software agent running thereon may derive these parameters measures from the running WMP instance; measures of other or similar parameters of the multimedia content stream 115 may be obtained by designing specific plug-ins for the software agents running on the monitoring units 130a, 130b, ..., 130n; for example, a plug-in may be designed adapted to measure (independently of the measure provided by WMP) the video frame rate, and/or to measure the audio sampling rate, and/or to measure the remote access (RAS) bitrate in reception.

The software agents may be configurable in order to perform the multimedia content stream parameters measurements in respective observation time windows 135a, 135b, ..., 135n, which may also partially or totally overlap with the observation time windows 135a, 135b, ..., 135n assigned to different software agents (as is for example the depicted case for the observation time windows 135b and 135n). The generic observation time window 135a, 135b, ..., 135n forms a temporal segment of the multimedia content stream 115. The generic software agent may be configured to perform measures of the parameters of the multimedia content stream 115 periodically, for example every day at a specified time, and/or one or more times during a day. The choice of when the measures have to be performed may for example be made to monitor different times of a day, corresponding for example to different conditions of congestion of the content providers 105 and/or of the telecommunications network 110 (for example, hours in which several users enjoy the multimedia content distribution service).

The various software agents running in the monitoring units 130a, 130b, ..., 130n may be in communication relationship with a data processor, for example a personal computer 140, which receives the measures performed by the software agents in order to allow an operator, e.g., the Telco owning the telecommunications network 110 to analyze the results of a monitoring session of the multimedia content stream 115.

The monitoring units 130a, 130b, ..., 130n are also in communications relationship with a server computer 145, configured to receive the parameters measures performed by the software agents at the end of a monitoring campaign (e.g., at the end of each temporal segment of the multimedia content stream 115); the server 145 stores the received measures in a database 150, and is programmed to execute a software for the analysis of the received measures, particularly in order to derive an estimation of the quality of experience by the user. An operator of the telecommunications network 110 may interact with the server 145 using a terminal 155.

Figure 2:
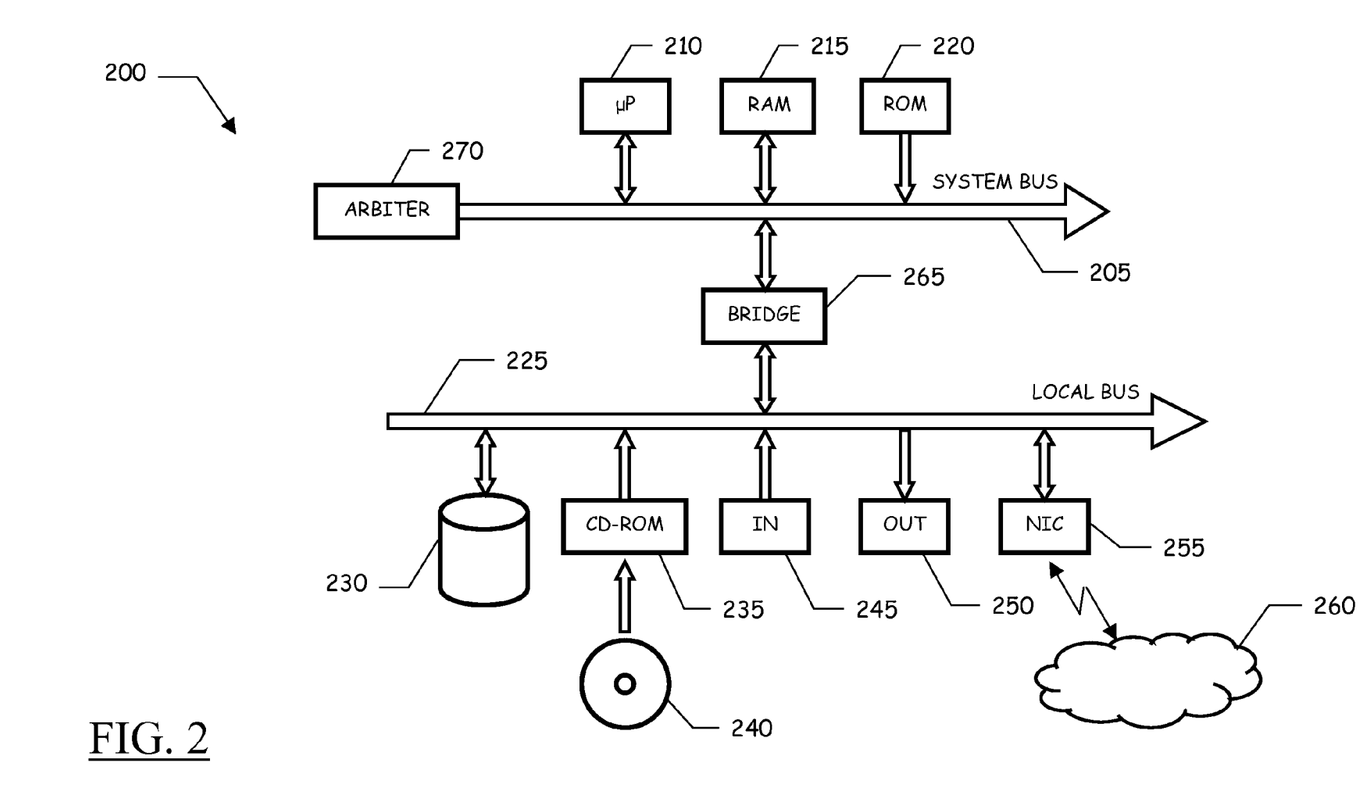
FIG. 2 schematically shows, in terms of the main functional blocks, the structure of a generic computer of the system of FIG. 1.

In FIG. 2, the structure of a generic computer 200 is schematically depicted; it may represent any of the computers or data processing devices depicted in FIG. 1 (e.g., the user equipment 120, the monitoring units 130a, 130b, ..., 130n, the computer 140, the server 145, the terminal 155).

The computer 200 is comprised of several units that are connected in parallel to a system bus 205. In detail, one (possibly more) processor (μp) 210 controls the operation of the computer 200; a RAM 215 is directly used as a working memory by the microprocessor 210, and a ROM 220 stores the basic code for a bootstrap of the computer 200. Peripheral units are connected (by means of respective interfaces) to a local bus 225. Particularly, mass storage devices comprise a hard disk 230 and a CD-ROM/DVD-ROM drive 235 for reading CD-ROMs/DVD-ROMs 240. Moreover, the computer 200 typically includes input devices 245, for example a keyboard and a mouse, and output devices 250, such as a display device (monitor) and a printer. A Network Interface Card (NIC) 255 may be provided to connect the computer 200 to a wired and/or wireless communications network 260, e.g. a LAN. A bridge unit 265 interfaces the system bus 205 with the local bus 225. The (each) microprocessor 210 and the bridge unit 265 can operate as master agents requesting an access to the system bus 205 for transmitting information; an arbiter 270 manages the granting of the access to the system bus 205.

It is pointed out that FIG. 2 is only aimed at providing an example; depending on the specific type of equipment, one or more of the units shown in FIG. 2 may be absent, while other units may be present (for example, a cellular phone usually does not include a hard-disk drive, nor a CD-ROM/DVD-ROM drive, whereas it includes, inter alia, a radio subsystem).

The computer 200 normally operates under the control of an operating system, which interacts with the different units. Application programs may be installed on the computer 200, e.g. downloading them from CDs/DVDs or from the communications network 260.

The server 145 may process the measures provided thereto by the software agents running in the monitoring units 130a, 130b, ..., 130n in order to derive a detailed indication of the different parameters of the multimedia content stream 115 measured during a measurement session (e.g., a temporal segment of the multimedia content stream 115), possibly aggregating the different measures in respect of the different levels of the protocol stack.

In the following, a method according to an embodiment of the present invention for deriving an estimation of the quality of experience perceived by a user enjoying a multimedia content distribution service will be described in detail. The method, which may for example be implemented at the server 145, exploits the measures of the characteristic parameters of the multimedia content stream 115 obtained by the software agents running in the monitoring units 130a, 130b, ..., 130n to calculate a value for a high-level indicator of the quality of the multimedia content as perceived by the user. In the following description, reference will be made to the schematic flowchart of FIG. 3, in which the main steps of the method are depicted.

The measures performed by the generic software agent during a measurement session, e.g. by the software agent running in the monitoring unit 130a in the time segment 135a, take the form of a temporal sequence of values. Let it be assumed for example that the software agent running in the monitoring unit 130a is devoted to measure the frame rate of a video component of the multimedia content stream 115, and that it performs a measure of the frame rate every second; an exemplary sequence of measures taken during the time segment 135a might be the following:

| | Seconds | | | | | | | | | |
|---|---|---|---|---|---|---|---|---|---|---|
| | 0 | 1 | 2 | 3 | 4 | 5 | 6 | 7 | 8 | 9 |
| Measured value (FR - frames/second) | 20 | 25 | X | 30 | X | X | 10 | X | 15 | 13 |

In the table above, the "X" means that, in the corresponding time instant, the software agent was not able to measure the parameter value (for example due to an error caused by a temporary failure in the hardware/software of the monitoring unit in which the software agent is running.

Figure 3:
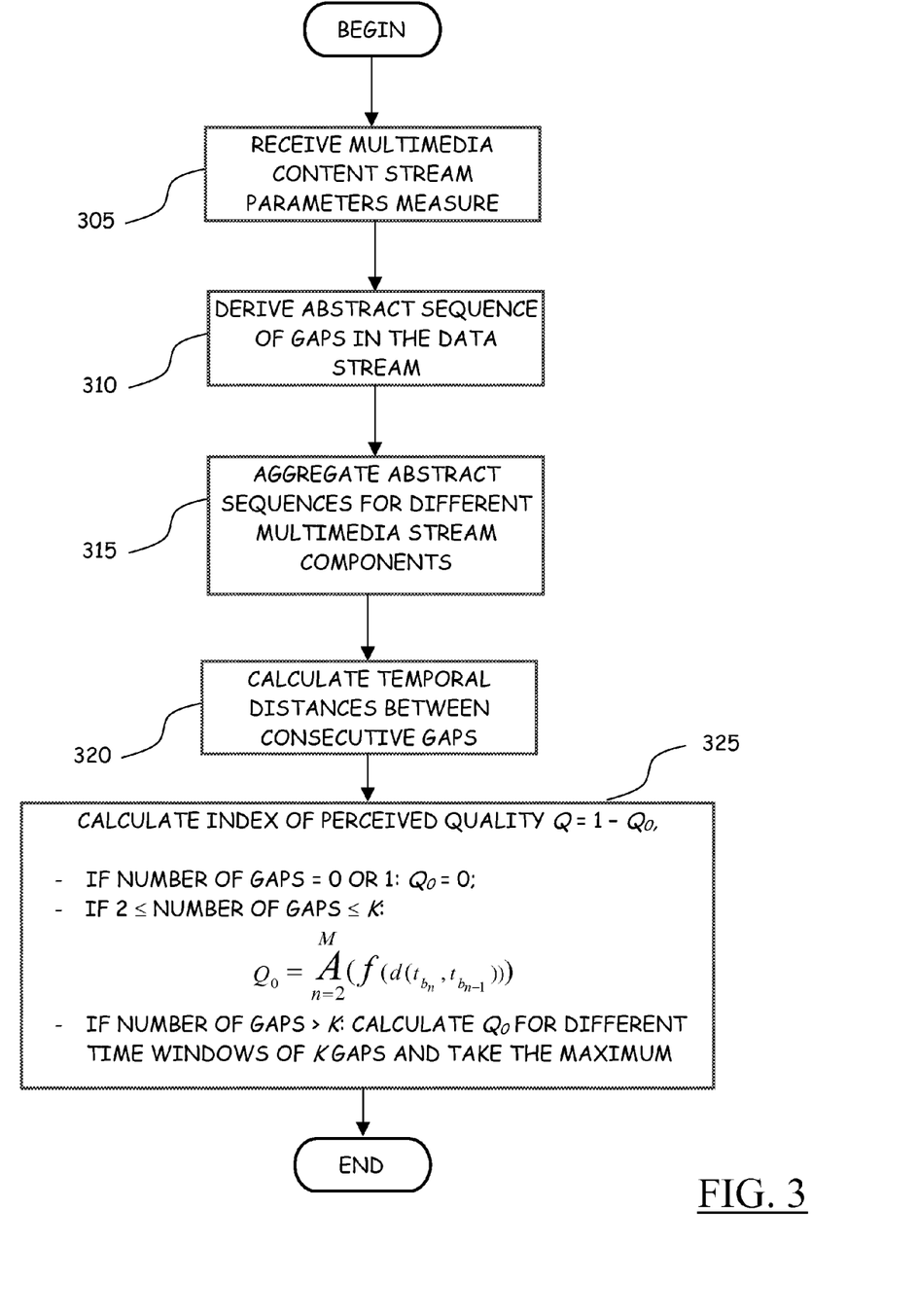
FIG. 3 is a schematic flowchart of a method according to an embodiment of the present invention.

The server 145 receives the measures from the software agent that performed them (block 305).

Reference threshold values for the various parameters of the multimedia content stream 115 measured by the various software agents are defined. For example, for each component of the multimedia content stream 115, one or more threshold values may be defined, each one corresponding to a respective parameter subject to being measured by one or more of the software agents; assuming just by way of example that the measured parameters are the video frame rate of a video component of the multimedia content stream 115, the audio sampling rate of an audio component of the stream 115, the bandwidth, the bitrate in reception, one threshold value is defined for each of these parameters. The threshold values may be set in the configuration phase of the system, and they may be reconfigurable by, e.g., a system manager.

The threshold values are used to transform a sequence of parameters measured values into an abstract representation that is independent of the nature of the parameter. The abstract representation is a temporal sequence of symbols of a binary alphabet, for example "1" or "0", wherein one of the two symbols denotes a "gap" or a "hole" in the stream, i.e. a value of the measured parameter which is below an acceptable threshold. Taking the example above of the video frame rate, and assuming that the threshold value is set to 20 frames/second (a value below which it is considered that the motion is not sufficiently fluid), the following abstract representation is for example obtained:

|  | Seconds | | | | | | | | | |
| --- | --- | --- | --- | --- | --- | --- | --- | --- | --- | --- |
|  | 0 | 1 | 2 | 3 | 4 | 5 | 6 | 7 | 8 | 9 |
| Time instant | $t_1$ | $t_2$ | | $t_3$ | | | $t_4$ | | $t_5$ | $t_6$ |
| Measured value (FR - frames/second) | 20 | 25 | X | 30 | X | X | 10 | X | 15 | 13 |
| Abstract rep. | 0 ($b_1$) | 1 | | 1 | | | 0 ($b_2$) | | 0 ($b_3$) | 0 ($b_4$) | wherein a "0" denotes a gap or hole. It can be seen that missing measures (the "X"s) are not taken into consideration in the construction of the abstract representation; four gaps $b_1$, $b_2$, $b_3$ and $b_4$ exist in the considered example The sequence of time instants where gaps or holes in the stream are encountered is then derived:

|  | Time instant | | | | | |
| --- | --- | --- | --- | --- | --- | --- |
|  | $t_1$ | $t_2$ | $t_3$ | $t_4$ | $t_5$ | $t_6$ |
| Abstract rep. | 0 | 1 | 1 | 0 | 0 | 0 |
| Gap time seq. | $t_{b1}$ | | | $t_{b2}$ | $t_{b3}$ | $t_{b4}$ |

A similar abstract sequence is obtained for each of the one or more parameters characterizing the (generic component of the) multimedia content stream 115, by comparing the measured values with the respective thresholds; for example, considering measures of the actual audio sample rate, the threshold may be set equal to 50% of the encoding sampling frequency.

In the flowchart of FIG. 3, the operations of deriving the abstract representations or sequences are indicated by block 310.

An aggregation operator may then be applied to the abstract representations in terms of gaps or holes obtained for the various components of the multimedia content stream 115, so as to derive an aggregated abstract representation of the whole multimedia content stream 115 (block 315). For the aggregation, different logic functions may be exploited; for example, considering a multimedia content stream 115 consisting of a video component and an audio component, an OR logic function might be applied, so that the presence of a gap in either the video or the audio component is regarded as a gap in the multimedia content stream 115. Different logic functions may be exploited for the aggregation operation, depending on which a gap in a specific one of the components of the multimedia content stream 115 is regarded or not as a gap in the stream as a whole.

An index of perceived quality Q is then calculated in respect of the multimedia content stream temporal segment considered. The index of perceived quality Q is calculated by means of a perceived quality estimation algorithm. The perceived quality estimation algorithm receives in input the abstract representation (in terms of gaps) of the measures of the parameters characterizing the multimedia content stream 115, obtained as described above. In other words, the input to the perceived quality estimation algorithm is the temporal sequence $t_1, t_2, \ldots, t_i, \ldots, t_N$ of the measures, where N denotes the total number of time instants for the considered multimedia stream temporal segment ($t_1, t_2, \ldots t_6$, in the example given above, in respect of one of the components of the multimedia content stream 115) (the missing measures—"X" in the table above—are not considered).

The temporal distances between consecutive gaps in the multimedia content stream 115 are then determined (block 320).

In an exemplary embodiment of the invention, the distances between the time instants $t_1, t_2, \ldots, t_i, \ldots, t_N$ may be expressed by means of integers: in such a case, the minimum distance between two time instants in the temporal sequence $t_1, t_2, \ldots, t_i, \ldots, t_N$ may be set to be equal to 1; two generic time instants in the temporal sequence $t_1, t_2, \ldots, t_i, \ldots, t_N$ which are at the minimum distance are hereinafter said to be adjacent in time.

In the abstract representation of the measures, a gap (symbol "0" in the convention adopted in the example given in the foregoing) may possibly be present at the generic time instant of the temporal sequence $t_1, t_2, \ldots, t_i, \ldots, t_N$. Let $b_1, b_2, \ldots, b_j, \ldots, b_M$ denotes the series of gaps in the considered multimedia content stream temporal segment; M denotes the total number of gaps encountered in the multimedia content stream 115 in that temporal segment. Let also $t_{b1}, t_{b2}, \ldots, t_{bj}, \ldots, t_{bM}$ denote the temporal sequence of the time instants at which the M holes $b_2, \ldots, b_j, \ldots, b_M$ are encountered (in the example given above, $t_{b1}, t_{b2}, t_{b3}, t_{b4}$); the time instants $t_{b1}, t_{b2}, \ldots, t_{bj}, \ldots, t_{bM}$ indicate the positions in time of the gaps.

Two generic gaps in the series $b_1, b_2, \ldots, b_j, \ldots, b_M$ which corresponds to time instants in the sequence $t_{b1}, t_{b2}, \ldots, t_{bj}, \ldots, t_{bM}$ being at the minimum distance are referred to as adjacent in time, or, simply, adjacent.

Once the mutual time distances of the time instants $t_{b1}, t_{b2}, \ldots, t_{bj}, \ldots, t_{bM}$ of the gaps are identified, the index of perceived quality Q is calculated, using the perceived quality estimation algorithm. The perceived quality estimation algorithm may exploit one or more parameters that affect its behavior.

In an embodiment of the present invention, one parameter K is used; the parameter K represents the minimum number of gaps for which a particular, worst-case distribution in time (temporal configuration) Cmin of the gaps in the considered multimedia stream time segment is regarded as corresponding to an unacceptable quality as perceived by the user, and to which an index of perceived quality Q equal to 0 is assigned. For example, the temporal configuration Cmin may correspond to a number of adjacent gaps equal to the value of the parameter K. In an embodiment of the present invention, the parameter K may take integer values, particularly integers greater than 2.

The calculation of the index of perceived quality Q is accomplished as follows.

The index of perceived quality Q is obtained as $Q=1-Q_0$, wherein $Q_0$ represents a level of degradation of the perceived quality (compared to $Q=1$, which by convention corresponds to the best perceived quality).

If, in the time sequence $t_1, t_2, \ldots, t_i, \ldots, t_N$, the number of gaps is not higher than a first predetermined gaps number, for example equal to 0 or 1 (i.e., $M=0$ or $M=1$), the level of degradation of the perceived quality is set equal to 0 ($Q_0=0$).

If, in the time sequence $t_1, t_2, \ldots, t_i, \ldots, t_N$, the number of gaps is comprised between a second predetermined gaps number (higher than the first predetermined gaps number, for example equal to the first predetermined gaps number plus 1) and the value assigned to the parameter κ (e.g., $2 \leq M \leq K$), the level of degradation $Q_0$ of the perceived quality is calculated by aggregating the contributions of the mutual distance of each consecutive pair of gaps in the sequence $t_{b1}, t_{b2}, \ldots, t_{bj}, \ldots, t_{bM}$, for example as follows:

$$Q_0 = \underset{n=2}{\overset{M}{A}}(f(d(t_{b_n}, t_{b_{n-1}}))) \qquad \text{eq. 1}$$

where $t_{bn}, t_{b(n-1)}$ are the temporal positions of two consecutive gaps $b_{(n-1)}, b_n$; $d(t_{bn}, t_{b(n-1)})$ is a function expressing the temporal distance between the time instants $t_{bn}, t_{b(n-1)}$; A is an aggregation function for aggregating the contribution of each pair of consecutive gaps to the level of degradation of the perceived quality; and $f$ is a function of the temporal distance between the time instants $t_{bn}, t_{b(n-1)}$. In particular, the function $f$ is such that it increases, in a non-linear way, as the time distance between the time instants $t_{bn}, t_{b(n-1)}$ decreases, and, for a given form of the aggregation function A, when M is equal to K and the distribution in time of the gaps is Cmin, the level of degradation $Q_0$ of the perceived quality is equal to 1.

In an embodiment of the present invention, the following function is exploited for calculating the level of degradation $Q_0$ of the perceived quality:

$$Q_0 = S \sum_{n=2}^{M} \frac{1}{\exp(\alpha(t_{b_n} - t_{b_{n-1}}))} \qquad \text{eq. 2}$$

where exp is the exponential function; α is a parameter that modulates the contribution of the generic pair of consecutive gaps in dependence of their mutual distance; S is a scale factor that allows the level of degradation $Q_0$ of the perceived quality to take values comprised between 0 and 1, and that allows satisfying the above condition that when M is equal to K and the distribution in time of the gaps is Cmin, the level of degradation $Q_0$ of the perceived quality is equal to 1; for example, $S=\exp(\alpha)/K$.

Comparing eq. 2 to eq. 1, it follows that in this embodiment of the invention it is:
$d(t_{bn}, t_{b(n-1)}) = t_{bn} - t_{b(n-1)}$,
$f(x) = S/\exp(\alpha \cdot x)$; and
A is the summation function.

Looking at eq. 2, it can be appreciated that the closer in time the gaps, the higher the level of degradation $Q_0$ of the perceived quality.

Figure 4:
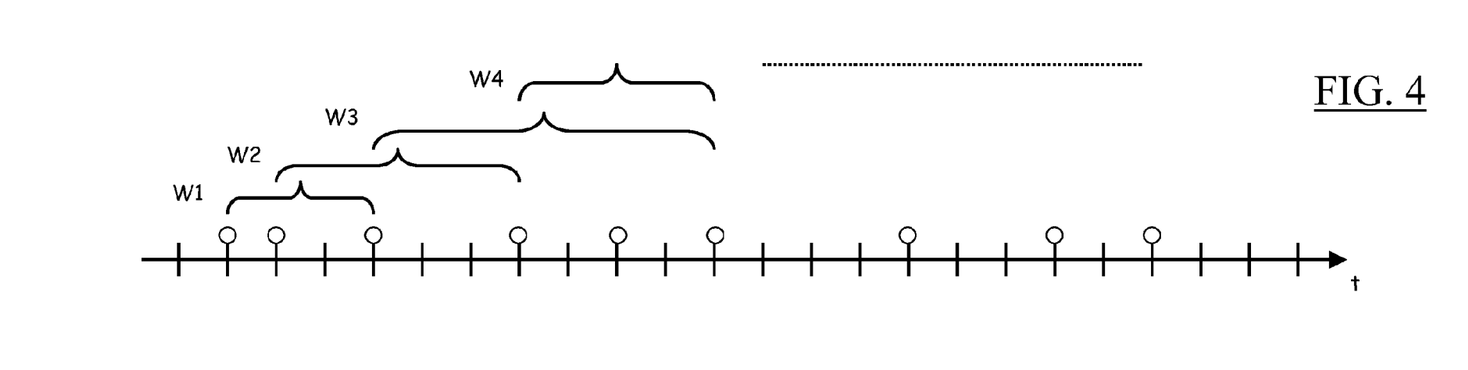
FIG. 4 pictorially shows a moving window technique according to an embodiment of the present invention adopted for calculating an index of perceived quality.

If the number M of gaps exceeds the value of the parameter K (M>K), the value of the level of degradation $Q_0$ of the perceived quality may be calculated, using eq. 1, for example using eq. 2, over a moving window containing K gaps, which shifts in time along the time sequence $t_1, t_2, \ldots, t_i, \ldots, t_N$ to progressively take into account the M holes; for each position of the moving window, a respective, partial value of the level of degradation $Q_0$ of the perceived quality is calculated, in the way described above. The overall value of the level of degradation $Q_0$ of the perceived quality is obtained by for example taking the maximum of the partial value of the level of degradation $Q_0$ of the perceived quality calculated for the different positions of the moving window (in other words, the value of the level of degradation $Q_0$ of the perceived quality is set equal to that calculated for the position of the moving window that corresponds to the worst configuration of gaps). FIG. 4 schematizes the procedure for K=3; in the drawing, the gaps are depicted as circles; four successive time windows W1, W2, W3 and W4 are shown, each containing three gaps.

Once the value of the level of degradation $Q_0$ of the perceived quality has been calculated, the index of perceived quality Q is obtained as follows:

$Q=1-Q_0$

As mentioned above, the index of perceived quality Q takes values ranging from 0 (worst perceived quality) to 1 (best perceived quality).

In the flowchart of FIG. 3, the operations for calculating the index of perceived quality Q are schematized by block 325.

The Applicant has conducted experimental trials that showed that suitable values for the parameters K and α are 7 and 0.07, respectively.

The server 145 may store the values of the index of perceived quality Q calculated in respect of different temporal segments of the multimedia content stream 115, and/or in respect of measures taken in different days. An operator may, by accessing the server 145 through the terminal 155, retrieve the calculated values to have an indication of the quality of the service, as perceived by the user. The server 145, or the operator, may derive from the calculated values of the index of perceived quality Q a qualitative indication of the quality of the service, for example in a scale from 0 (unacceptable quality) to 10 (optimum quality).

If the quality indication is below a certain threshold, the operator may decide to start a diagnosis. For example, he/she may analyze the measures of the various parameters characterizing the different components of the multimedia content stream 115 to have an idea of which problems caused such a low quality of the service; the measured parameters data may be correlated with measures of the transmitted multimedia stream 115 taken at the server(s) of the content provider(s), to figure out the cause of the bad quality perceived by the user. The possibility of performing a diagnostics when the perceived quality index is below a satisfactory level, by displaying and analysing the parameters collected during the multimedia stream distribution and those computed after is particularly useful to understand the causes of possible malfunctioning.

Figure 5:
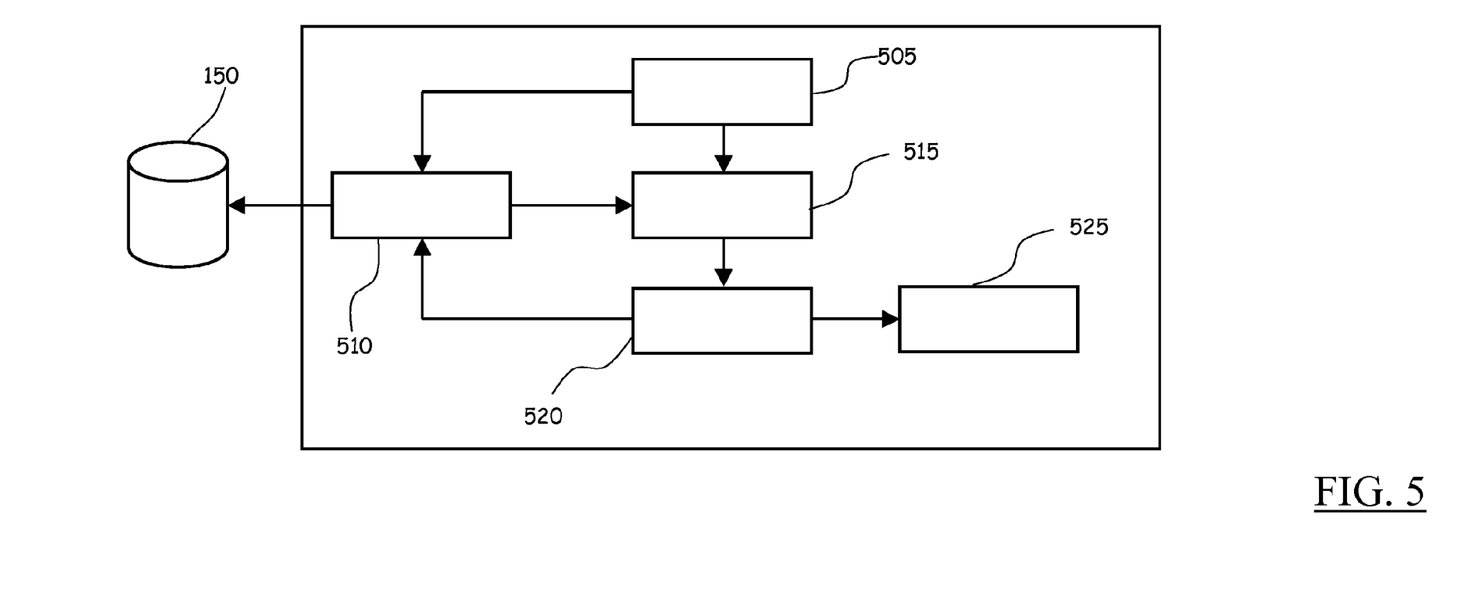
FIG. 5 is a schematic functional block diagram of the main modules of a computer software implementing a method according to an embodiment of the present invention.

The method according to the described embodiment of the present invention may be implemented in software; for example, an application software may be installed on the server 145 comprising software modules adapted to perform the operations described above. FIG. 5 depicts schematically, in terms of functional blocks, the main modules of such a software. A module 505 allows communicating with the software agents running in the monitoring units $130_1, \ldots, 130n$ for receiving there from the measured parameters; the received data are passed to a database manager module 510 that manages the data storage and retrieval into/from the database 150. A module 515 derives, from the measured parameters data stored in the database 150, the abstract representation used to calculate the index of perceived quality. The abstract representation is passed to a module 520 that calculates the index of perceived quality Q. The calculated index of perceived quality is stored in the database 150. A module 525 allows displaying the data on a display device, and to interact with the terminal 155.

The method according to the described embodiments of the invention allows obtaining an objective estimate of the quality of experience perceived by the users of audio and/or video distribution services. The estimate is obtained by considering the temporal distribution patterns of defects in the audio and/or video streams that are received by the users.

An advantage of the method is that it operates on measures that are taken emulating the situation in which a user is, when he/she is enjoying the service.

Another advantage of the method is that the estimation of the perceived quality of experience, i.e. the index of perceived quality, is calculated on an abstract representation derived from the actual measures of characteristic parameters of a multimedia content stream. Thus, the method can be applied irrespective of the specific nature of the measured parameters.

The present invention has been here described in connection to some exemplary embodiments thereof. The individual features described in respect of each invention embodiment could be variously combined. Several variations to the described embodiments, and different embodiments of the invention are possible, without departing from the protection scope defined in the appended claims.

The invention claimed is:

1. A method for estimating a quality of experience of a user receiving an information content stream distributed through a telecommunications network, comprising:
   collecting a plurality of measures of at least one characteristic parameter of the information content stream during distribution thereof through a telecommunications network;
   deriving from the collected measures an abstract representation in terms of gaps in the information content stream, wherein a gap corresponds to a value of a collected measure below a predetermined threshold;
   determining a temporal distribution of the gaps in the information content stream; and
   calculating an index of perceived quality of experience based on said temporal distribution of the gaps in the information content stream, wherein said index of perceived quality is related in a non-linear way to said temporal distribution of the gaps.

2. The method of claim 1, wherein determining a temporal distribution of the gaps in the information content stream comprises assessing a temporal distance between the gaps in the information content stream.

3. The method of claim 2, wherein calculating an index of perceived quality of experience based on said temporal distribution of the gaps comprises aggregating a contribution of each pair of consecutive gaps to a level of degradation of the perceived quality of experience.

4. The method of claim 3, wherein aggregating a contribution of each pair of consecutive gaps comprises applying to said temporal distribution of the gaps a function:

$$\underset{n=2}{\overset{M}{A}}(f(d(t_{b_n}, t_{b_{n-1}})))$$

wherein:
   $t_{bn}$, $t_{b(n-1)}$ are temporal positions of two consecutive gaps $b_{(n-1)}$, $b_n$;
   $d(t_{bn}, t_{b(n-1)})$ is a function expressing temporal distance between time instants $t_{bn}$, $t_{b(n-1)}$;
   A is an aggregation function for aggregating a contribution of each pair of consecutive gaps to the level of degradation of the perceived quality; and
   $f$ is a function of the temporal distance between the time instants $t_{bn}$, $t_{b(n-1)}$.

5. The method of claim 4, wherein the function $f$ increases, in a non-linear way, as the time distance between the time instants $t_{bn}$, $t_{b(n-1)}$, decreases, and, when an overall number M of gaps in the collected measures is equal to a predetermined number and a distribution in time of the gaps corresponds to a worst-case distribution, a level of degradation of the perceived quality is equal to 1.

6. The method of claim 4, wherein aggregating a contribution of each pair of consecutive gaps comprises applying to said temporal distribution of the gaps a function:

$$S \sum_{n=2}^{M} \frac{1}{\exp(\alpha(t_{b_n} - t_{b_{n-1}}))}$$

wherein:
   exp is the exponential function;
   α is a parameter modulating a contribution of a generic pair of consecutive gaps in dependence of their mutual temporal distance; and
   S is a scale factor.

7. The method of claim 1, wherein the information content stream distributed through a telecommunications network comprises at least one among an audio and a video stream.

8. The method of claim 1, wherein said at least one characteristic parameter comprises at least one among a video frame rate, an audio sampling rate, a network bandwidth, and a bitrate on receipt.

9. A system for estimating a quality of experience of a user receiving an information content stream distributed through a telecommunications network, comprising:
   at least one unit for collecting a plurality of measures of at least one characteristic parameter of the information content stream during distribution thereof through a telecommunications network;
   a unit for deriving from collected measures an abstract representation in terms of gaps in the information content stream, wherein a gap corresponds to a value of a collected measure below a predetermined threshold;
   a unit for determining a temporal distribution of the gaps in the information content stream; and
   a unit for calculating an index of perceived quality of experience based on said temporal distribution of the gaps in the information content stream, wherein said index of perceived quality is related in a non-linear way to said temporal distribution of the gaps.

10. The system of claim 9, wherein said unit for determining a temporal distribution of the gaps in the information content stream is capable of being adapted to assess a temporal distance between the gaps in the information content stream.

11. The system of claim 10, wherein said unit for calculating an index of perceived quality of experience based on said temporal distribution of the gaps is capable of being adapted to aggregate a contribution of each pair of consecutive gaps to a level of degradation of the perceived quality of experience.

12. The system of claim 11, wherein said unit for calculating an index of perceived quality of experience is capable of being adapted to aggregate said contribution of each pair of consecutive gaps by applying to said temporal distribution of the gaps a function:

$$\underset{n=2}{\overset{M}{A}}(f(d(t_{b_n}, t_{b_{n-1}})))$$

wherein:

$t_{bn}$, $t_{b(n-1)}$ are temporal positions of two consecutive gaps $b_{(n-1)}$, $b_n$;

$d(t_{bn}, t_{b(n-1)})$ is a function expressing temporal distance between time instants $t_{bn}$, $t_{b(n-1)}$, A is an aggregation function for aggregating a contribution of each pair of consecutive gaps to the level of degradation of the perceived quality; and $f$ is a function of the temporal distance between the time instants $t_{bn}$, $t_{b(n-1)}$.

13. The system of claim 12, wherein the function $f$ increases, in a non-linear way, as the time distance between the time instants, $t_{bn}$, $t_{b(n-1)}$, decreases, and, when an overall number M of gaps in the collected measures is equal to a predetermined number and a distribution in time of the gaps corresponds to a worst-case distribution, a level of degradation of the perceived quality is equal to 1.

14. The system of claim 12, wherein said unit for calculating an index of perceived quality of experience is capable of being adapted to aggregate said contribution of each pair of consecutive gaps by applying to said temporal distribution of the gaps a function:

$$S \sum_{n=2}^{M} \frac{1}{\exp(\alpha(t_{b_n} - t_{b_{n-1}}))}$$

wherein:

exp is an exponential function;

$\alpha$ is a parameter modulating a contribution of a generic pair of consecutive gaps in dependence of a mutual temporal distance thereof; and S is a scale factor.

15. The system of claim 9, wherein the information content stream distributed through a telecommunications network comprises at least one among an audio and a video stream, and said at least one characteristic parameter comprises at least one among a video frame rate, an audio sampling rate, a network bandwidth, and a bitrate on receipt.

* * * * *